UNITED STATES PATENT OFFICE.

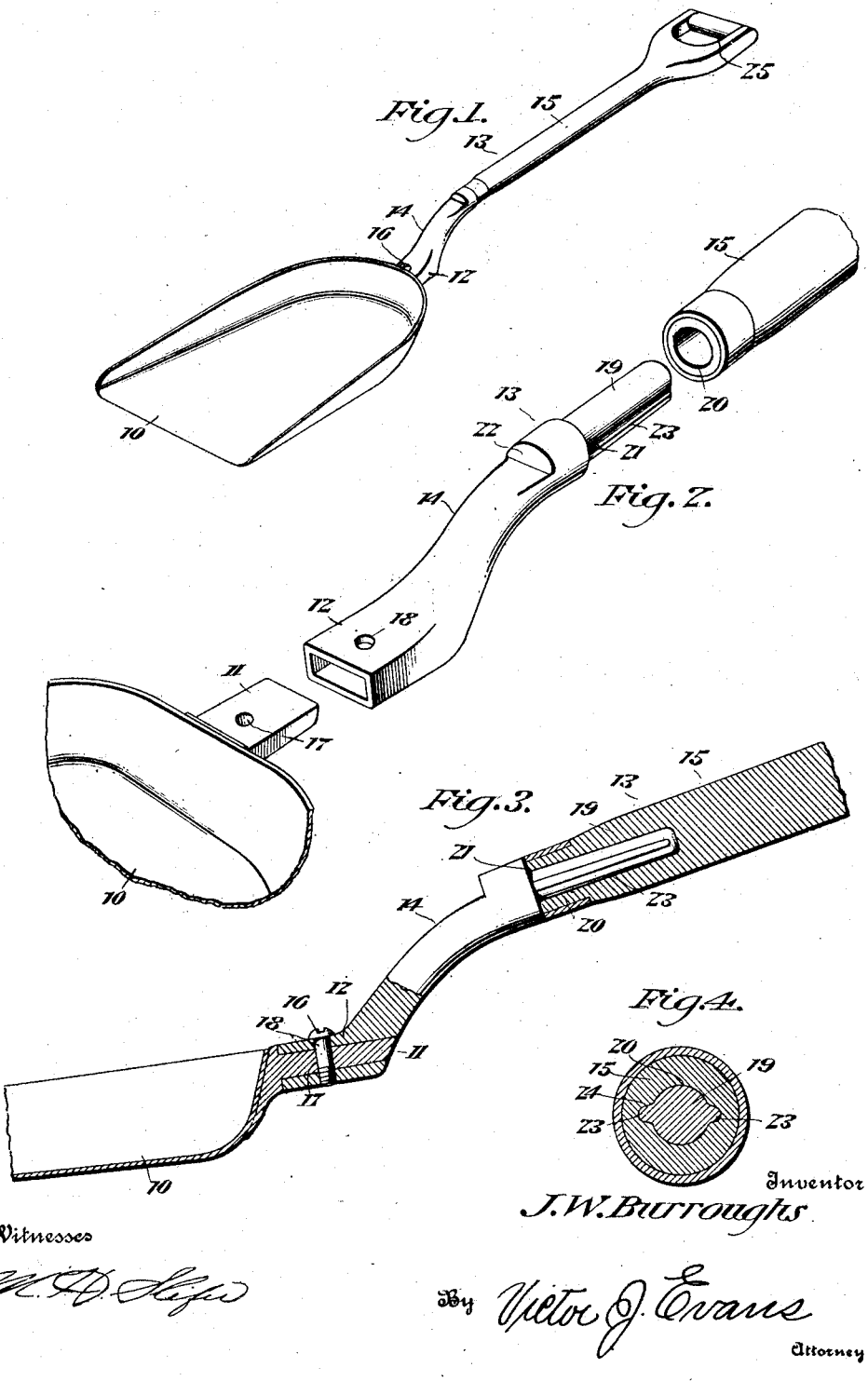

JAMES W. BURROUGHS, OF ROANOKE, VIRGINIA.

UNIVERSAL HANDLE FOR TOOLS.

1,365,453. Specification of Letters Patent. Patented Jan. 11, 1921.

Application filed April 15, 1918. Serial No. 228,710.

*To all whom it may concern:*

Be it known that I, JAMES W. BURROUGHS, a citizen of the United States, residing at Roanoke, in the county of Roanoke and State of Virginia, have invented new and useful Improvements in Universal Handles for Tools, of which the following is a specification.

This invention relates to shovels and aims to provide a handle which may be easily and quickly secured to or removed from the shovel blade in the event of the blade becoming worn or unfit for use.

The invention resides particularly in providing a curved member, preferably formed of metal, which is interposed between and removably connected to the handle and the blade, permitting of either the handle or blade being replaced when necessary with the minimum amount of time and labor and in a manner to leave no worn surface for contact with the hands of the user, the curved connecting member also permitting of the use of straight handles and thereby eliminating the expense of steaming and bending the handles.

The invention also resides in the particular manner of connecting the curved member to the blade and handle, permitting of a perfect interchangeability of blades, the joints being made so as to provide a ready interlocking of the above members to prevent relative turning of the blade and handle.

In the drawings:—

Figure 1 is a perspective view of a shovel embodying the present invention;

Fig. 2 is a similar view with the blade and handle sections separated;

Fig. 3 is a central longitudinal sectional view taken through the curved connecting member and the contiguous parts of the shovel blade and handle; and Fig. 4 is a transverse sectional view through the point of the two sections of the handle.

In carrying out the invention, there is provided a shovel including a blade 10, which may be of any desired form, such as a scoop, spade or any other type of shovel, or a spading or coke fork may be substituted for the blade. This blade has formed thereon or connected thereto a tongue or lug 11, preferably of rectangular shape in cross section, the said tongue being removably fitted within a socket 12 formed in one end of one section of a handle 13. The handle comprises two sections 14 and 15, the former being the connecting member between the straight section 15 of the handle and the shovel blade 10. The section 14 is curved as shown and as stated is provided at one end with a socket 12, to receive the lug 11, which is removably held therein through the medium of a screw 16 or other fastening device, alined openings 17 and 18 being formed in the lug 11 and the section 14 respectively for this purpose.

The opposite end of the section 14 is provided with an extremity 19, which is adapted to have a driving fit within a socket 20 formed in the adjacent end of the straight section 15 of the handle, a shoulder 21 serving to limit the entrance of the tapered extremity 19 within the socket. The section 14 is provided with a shouldered striking surface 22, by means of which the tapered extremity 19 may be driven into the socket 20, without mutilating the section. In order to prevent relative turning of the sections 14 and 15, the extremity 19 is provided with diametrically disposed lugs 23, which are driven within the section 15 entering the section on opposite sides of the socket and preventing relative rotation of the parts. Any suitable form of grip 25 may be provided upon the opposite end of the section 15.

By the construction just described the blade 10 may be easily removed and a new blade secured to the handle when desired, or should the straight section 15 of the handle become unfit for use a new section may be secured to the curved section 14, the construction of the latter being such as to last indefinitely. The invention possesses the additional advantage of providing an absolutely smooth connection of the various parts, so that there are no projecting, ragged edges due to the careless riveting of a handle to the ordinary shovel blade. As the removable member of the handle is straight, the curve being provided for in the section 14, the cost of substituting a new handle is materially reduced.

By forming the lug 11 tapered in the manner shown for entrance into the tapered socket, the said lug may be securely wedged in position so as to prevent relative movement of the handle, and scoop, and by having the socket open at both ends as shown in Fig. 3, provision is made for driving the lug from the socket when a new scoop is attached and in the event of the said lug becoming rusted or wedged in position.

The invention is susceptible of various changes in its form, proportions and minor details of construction and the right is reserved to make any and all changes as properly fall within the scope of the appended claim.

Having described the invention, what is claimed is:—

A tool handle embodying a straight grip section having a socket in one end, a curved section, a reduced cylindrical extremity carried by one end of the curved section for frictional engagement with said socket, the juncture of the inner end of the cylindrical extremity with the curved section defining an annular shoulder to limit the entrance of the said extremity within the socket, a relatively large transversely disposed flattened portion formed on the curved section adjacent the reduced cylindrical extremity, one end of said large portion defining a striking shoulder substantially alined with the cylindrical extremity and means for detachably connecting the opposite end of the curved section to a tool.

In testimony whereof I affix my signature.

JAMES W. BURROUGHS.